(12) United States Patent
Obermüller

(10) Patent No.: US 10,531,634 B1
(45) Date of Patent: Jan. 14, 2020

(54) ANIMAL HOOF CLEANING SYSTEM AND A METHOD OF CLEANING AN ANIMALS HOOFS

(71) Applicant: DELAVAL HOLDING AB, Tumba (SE)

(72) Inventor: Helmut Obermüller, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

(21) Appl. No.: 16/481,170

(22) PCT Filed: Feb. 2, 2018

(86) PCT No.: PCT/SE2018/050087
§ 371 (c)(1),
(2) Date: Jul. 26, 2019

(87) PCT Pub. No.: WO2018/143884
PCT Pub. Date: Aug. 9, 2018

(30) Foreign Application Priority Data

Feb. 3, 2017 (SE) ..................................... 1750092

(51) Int. Cl.
*A01K 13/00* (2006.01)
*A01J 7/00* (2006.01)
(Continued)

(52) U.S. Cl.
CPC ............ *A01J 5/007* (2013.01); *A01J 5/0175* (2013.01); *A01K 1/12* (2013.01); *A01K 13/001* (2013.01); *A01L 15/00* (2013.01)

(58) Field of Classification Search
CPC .. A01K 13/003; A01K 13/001; A01K 11/006; A01K 1/12; A01K 29/005; A01J 5/0175; A01J 5/007; A01J 7/00
(Continued)

(56) References Cited

U.S. PATENT DOCUMENTS 4,000,718 A * 1/1977 Brown .................... A01K 1/12
119/14.03
5,630,379 A * 5/1997 Gerk .................... A01K 13/001
119/667
(Continued)

FOREIGN PATENT DOCUMENTS

DE 202014008567 U1 11/2014
EP 1099373 A1 5/2001
(Continued)

OTHER PUBLICATIONS

International Search Report and Written Opinion, dated Apr. 11, 2018, from corresponding PCT application No. PCT/SE2018/050087.
(Continued)

*Primary Examiner* — Yvonne R Abbott-Lewis
(74) *Attorney, Agent, or Firm* — Young & Thompson

(57) ABSTRACT

An animal hoof cleaning system that includes an automatic milking station, an automatic spraying device configured to clean at least one hoof of an animal housed in the automatic milking station by spraying a fluid towards the at least one hoof, a control unit that controls the operation of the automatic spraying device, and detecting means that detects a milking state wherein all the teats of the animal are enclosed in respective teat cups, where the control unit is configured to control the operation of the automatic spraying device on basis of information from the detecting means such that the automatic spraying device sprays on the hoof of the animal only when the detecting means detects the milking state.

16 Claims, 2 Drawing Sheets

(51) Int. Cl.
*A01J 5/007* (2006.01)
*A01K 1/12* (2006.01)
*A01J 5/017* (2006.01)
*A01L 15/00* (2006.01)

(58) Field of Classification Search
USPC .......... 119/665, 667, 669, 666, 14.02, 14.08, 119/14.3, 14.04, 14.18, 654, 656
See application file for complete search history.

(56) References Cited

U.S. PATENT DOCUMENTS

| | | | |
|---|---|---|---|
| 5,816,190 A | 10/1998 | Van Der Lely | |
| 2007/0074672 A1* | 4/2007 | Torgerson | A01K 13/003 119/667 |
| 2009/0283053 A1* | 11/2009 | Torgerson | A01K 13/003 119/669 |
| 2012/0090550 A1* | 4/2012 | Schlicher | A01K 13/001 119/669 |
| 2012/0174872 A1* | 7/2012 | Richards | A01L 15/00 119/665 |
| 2012/0272902 A1* | 11/2012 | Hofman | A01J 5/013 119/14.02 |
| 2015/0201583 A1* | 7/2015 | Greeson | A01K 13/003 119/651 |
| 2017/0265449 A1 | 9/2017 | Hallen Sandgren | |

FOREIGN PATENT DOCUMENTS

| | | | |
|---|---|---|---|
| EP | 1240820 A1 | 9/2002 | |
| EP | 2163155 A1 * | 3/2010 | ........... A01K 13/001 |
| WO | 2016/056975 A1 | 4/2016 | |
| WO | WO-2016056975 A1 * | 9/2017 | ............ A01L 15/00 |
| WO | WO-2018143884 A1 * | 8/2018 | ............. A01J 5/007 |

OTHER PUBLICATIONS

Swedish Search Report, dated Oct. 13, 2017, from corresponding SE application No. 1750092-7.

* cited by examiner

ANIMAL HOOF CLEANING SYSTEM AND A METHOD OF CLEANING AN ANIMALS HOOFS

TECHNICAL FIELD

The present invention relates to an animal hoof cleaning system comprising: an automatic milking station configured to automatically milk an animal therein, said automatic milking station comprising a set of teat cups that are configured to be attached to the teats of said animal during milking thereof, an automatic spraying device configured to clean at least one hoof of an animal housed in said automatic milking station by spraying a fluid towards said at least one hoof of said animal, a control unit configured to control the operation of the automatic spraying device, and detecting means configured to detect a milking state in which each teat of an animal housed in the milking station is attached to a respective teat cup.

The present invention also refers to a method of cleaning at least one hoof of an animal in an automatic milking station, in which a fluid is sprayed onto the at least one hoof of an animal that is housed in the milking station and is being milked in said milking station, wherein said spraying is performed by an automatic spraying device mounted in said milking station, and wherein the operation of the automatic spraying device is controlled by a control unit.

BACKGROUND AND PRIOR ART

Systems for the cleaning of the hoofs of an animal, typically a cow, housed in an automatic milking station is known through prior art. For example, WO 2016/056975, filed by the present applicant, discloses such a system as well as the medical reasons for the need thereof. The medical reasons for cleaning and/or treatment of the hoofs of an animal, typically a cow, will therefore not be further described here, but are to be regarded as well-known to the person skilled in the art.

WO 2016/056975 suggests that the hoofs of an animal that enters an automatic milking station are first cleaned by means of an automatic spraying device provided in the automatic milking station. This cleaning is followed by an ocular assessment of the condition of the hoofs by means of a camera mounted in the automatic milking station, and, finally, if the ocular assessment results in a decision in favour of a treatment, a treatment of the hoofs is performed by spraying a treatment fluid on the hoofs. The camera may be the same camera as the one that is used for determining the position of the teats of the animal and that is connected to a robot that controls the attachment of teat cups to the teats of the animal on basis of information from said camera. The treatment may be performed in the automatic milking station and by use of the same automatic spraying device as the one that is used for the cleaning sequence. Alternatively, as a consequence of a decision in favour of treatment, the animal is guided into a separate treatment station in which the treatment is performed.

However, the present applicant has come to realise that the use of spraying, instead of using a footbath or the like, results in the formation of aerosols, or a mist, that may reach the udder of the animal. These aerosols will contain bacteria and dirt. When a cow enters an automatic milking station her teat canals are often open. This is a pathway for bacteria into the udder. The aerosols formed by the cleaning process thereby risk to cause infection of the udder of the cow. This problem is not addressed by prior art.

It is thus an object of the present invention to suggest a solution to the abovementioned problem and thereby to enable efficient cleaning of the hoofs of an animal housed in an automatic milking station for the purpose of being milked in said station, with reduced risk of udder infection caused by said hoof cleaning.

SUMMARY OF THE INVENTION

The object of the present invention is achieved by means of the initially defined animal hoof cleaning system, characterised in that the control unit is configured to control the operation of the automatic spraying device on basis of information from the detecting means, and that the control unit is configured to activate the spraying device for spraying on said at least one hoof of said animal only when the detecting means has detected said milking state in which each teat of an animal housed in the automatic milking station is attached to a respective teat cup.

By strictly avoiding any hoof cleaning (spraying towards the hoofs) while the teats of the animal are uncovered by the teat cups, the risk of infection caused by aerosols generated as a result of said spraying is avoided. Activation of the spraying device is referred to as activation in the meaning that the spraying device sprays a fluid towards the hoofs of an animal for a cleaning purpose. Accordingly, spraying in a totally other direction (with no intention of hitting the hoofs), or in such a way that no cleaning is performed or no aerosol harmful to the udder of the animal is generated or reaches said udder, is not to be regarded as an activation of the automatic spraying device in the meaning of the invention, but as an inactivation thereof. However, preferably, activation comprises spraying and inactivation comprises no spraying. The control unit may be any control arrangement able of receiving signals from the detecting means and generate a control signal to the automatic spraying device on basis thereof. For example, the control unit may comprise a computer or any suitable combination of software and hardware that is configured for the purposes described. The automatic spraying device may be configured to spray on each hoof of the animal. However, according to one embodiment, the automatic spraying device is configured only to spray on the rear hoofs of the animal, preferably from a position behind the animal.

According to one embodiment, the control unit is configured to delay the activation of the automatic spraying device with at least 10 seconds from the moment at which the detection means detects said milking state. The delay is due to the fact that the animal, typically a cow, is more likely to kick off the teat cups within the first 10 seconds after attachment. Accordingly, by having a delay, the risk of unwanted exposure of a teat to the mist or aerosol from the automatic spraying device is reduced.

According to one embodiment the control unit is configured to activate the automatic spraying device within approximately 60 seconds from the moment at which the detection means detects said milking state. After approximately 60 seconds from the attachment of a teat cup, which immediately applies a vacuum onto the teat and initiates a milking sequence, the milking is in full progress. Given the fact that there might be individual animals that may be to some extent disturbed by the cleaning sequence, it is thus preferred to perform, or at least start the cleaning while the milking is not yet in full progress. Preferably, according to one embodiment, the control unit is thus configured to end the activation of the spraying device within approximately 60 seconds from said moment at which the detection means detects said milking state. It is also preferred to end the spraying as long time as possible before the milking ends and the teat cups are detached.

A further possible aspect of the invention is to provide for ending of the spraying in as good time as possible before an expected detachment of any of the teat cups from the teats, in order to avoid the presence of a remaining aerosol in the region of the udder of the animal at the moment when the milking session ends by detachment of the teat cups from the teats. One way of solving that problem may be by starting the cleaning within a predetermined time after detection of said milking state, for example within 60 seconds from detection thereof, as suggested. The duration of the activation of the automatic spraying device is short, for example 0.5-5 seconds. Since it can be assumed that said milking state will exist for more than a couple of minutes during a milking session, an initiation of spraying within 60 seconds from start of said milking state and use of said rather short-time spraying can be expected to be sufficient in order to avoid a remaining possibly harmful aerosol mist upon ending of said milking state.

Another possible way of solving said problem may be to measure the milk rate of each teat and on basis thereof make a presumption of when said milking state will end, wherein the control unit is connected to milk meters that perform said measurement and is configured to activate the automatic spraying device to perform its cleaning operation and to deactivate said automatic spraying device a predetermined time before the presumed ending of the milking state. According to one aspect, the presumed ending of the milking state may be decided on basis of a measured change of milking rate or on basis of prior data regarding how much milk could be expected from a teat and how long time milking could be expected from that teat. Such information could thus serve as the basis on which the control unit initiates and ends the hoof cleaning operation of the automatic spraying device. The control unit may be configured to estimate the time of ending of said milking state on basis of milk rate measurement from said milk meters. According to one aspect, the control unit is configured to inactivate the automatic spraying device at the latest 1 minute, preferably 2 minutes and most preferably 3 minutes, before the thus presumed ending of said milking state.

According to one embodiment, the control unit is configured to inactivate the automatic spraying device a predetermined time period after the activation thereof or upon detection by the detection means that any teat cup is detached from its associated teat, whichever occurs first. The duration of an individual cleaning sequence during which said fluid is sprayed onto the hoof of the animal, may be as short as a few second, for example 0.5-5 seconds. Should, however, a teat cup be detached from its associated teat during such a sequence, it is important to immediately stop the spraying in order to minimize the risk of infecting the udder of the animal.

According to one embodiment, the automatic milking system comprises a respective milk meter configured to measure milk flow from a respective teat of the animal, wherein said detecting means comprises said milk meters. When a teat cup is attached to the teat of an animal to be milked, milk transportation that is registered by the milk meter starts almost immediately, even if the milking is not yet in full progress. If the teat cup is detached from the teat, intentionally or unintentionally, during or at the end of a milking session, this will also be detected by the milk meter as a sudden reduction in milk transportation. Accordingly a milk meter may have the function of a detecting means by means of which it can be concluded whether there is any teat that is detached from its teat cup. There is provided one separate milk meter for measuring the flow of milk from a teat, wherein each milk meter is used as said detecting means. The information from the milk meters may also be used for the purpose of estimating an expected time of ending of said milking state during a milking session, and to control the automatic spraying device on basis thereof, for example in the way described hereinabove.

According to one embodiment, the automatic milking system comprises at least one vacuum meter configured to measure the pressure in a milk line in which milk from the teats flows, wherein said detecting means comprises said at least one vacuum meter. Using the vacuum meter as said detecting means has the advantage that the detection of an attached teat cup or detached teat cup becomes almost immediate. Upon detachment of a teat cup, the pressure in the milking line drops immediately. According to one embodiment, there is only one common vacuum meter provided for all teat cups of the automatic milking device. A single vacuum meter may thus be sufficient as the detecting means.

According to one embodiment, the automatic milking system comprises a respective vacuum meter configured to measure the pressure in a respective milk line for a respective teat of the animal, wherein said detecting means comprises said vacuum meters. In other words, the milking system comprises a plurality of vacuum meters. Each such meter is configured to measure the vacuum in the milk line from a respective teat cup, wherein the vacuum meters are arranged at position in the milk line upstream the position in which the milk lines of the respective teat cups are joined into a common milk line.

According to one aspect of the invention, the detecting means could include both milk meters and at least one vacuum meter. The milk meters may be used primarily to estimate the time of ending of said milking state, while the vacuum meter is used for the immediate detection of sudden and non-expected ending of said milking state, for example due to accidental and unexpected kick-off of the teat cup by the animal.

The vacuum meter may also be preferred for the detection of said milking state. Using both milk meters and a vacuum meter will also provide improved functional reliability and redundancy in case of failure of any of said meters.

According to one embodiment, the automatic spraying device comprises nozzles the position and spraying direction of which are controllable, a data storage means configured to comprise information regarding the expected hoof position of individual animals that are assumed to enter the automatic milking station, and an identification device configured to identify which animal is housed in the automatic milk station, wherein the control unit is operably connected to said data storage means and to said identification device and configured to control the position and spraying direction of the nozzles of the automatic spraying device on basis of which animal that is positioned in the automatic milking station and on basis of said information regarding that animal's expected hoof position. For this purpose there may be provided a driving means, such as an electric motor or a hydraulic drive mechanism or the like, by means of which the position of one or more of the nozzles is/are controlled by the control unit. Hoof position is referred to as the position of one or more of the hoofs of the animal.

The object of the invention is also achieved by means of the initially defined method, characterised in that it comprises the steps of:

detecting by means of a detecting means a milking state in which each of the teats of said animal has become attached to a respective teat cup of an automatic milking device associated to the automatic milking station, and initiating said spraying of said at least one hoof of said animal only upon detection of said milking state and while the teats are still attached to and covered by the teat cups, wherein the initiation of the spraying of the at least one hoof is controlled by a control unit which is connected to said detecting means and to said automatic spraying device.

According to one embodiment, the initiation of the spraying of the hoofs is delayed with at least 10 seconds from the moment at which the detection means detects said milking state.

According to one embodiment, the initiation of the spraying of the hoofs is performed within approximately 60 seconds from the moment at which the detection means detects said milking state. It is assumed that the detecting means detects said milking state within a few seconds, not more than five seconds, from the moment at which said milking state actually occurs. Within approximately 60 seconds from the actual start of said milking state the milking is assumed to be in full progress, and according to one aspect of the invention it is preferred that the cleaning is performed before that phase of the milking session.

According to one embodiment, spraying of the hoofs of said animal is ended within a predetermined time period after the initiation thereof or upon detection by the detection means that any teat cup is detached from its associated teat, whichever occurs first. According to one embodiment said predetermined time period is set to be in the range of 0.5-5 seconds.

According to one embodiment, said milking state in which each teat of an animal housed in the automatic milking station is attached to a respective teat cup is detected by registration of the milk flow in milk lines in which milk flows from the teat cups during milking of said animal.

According to one embodiment, said milking state in which each teat of an animal housed in the automatic milking station is attached to a respective teat cup is detected by registration of the pressure in a milk line in which milk from the teat cups flow during milking of said animal.

According to one embodiment said milking state is detected by registration of the pressure in a respective milk line in which milk from a respective teat of the animal flows.

According to one embodiment, the method of the present invention also comprises the steps of identifying the animal by means of a device for identifying the animal, making an assumption of an expected hoof position of the animal by the aid of means that comprises data regarding the expected hoof position of individual animals that are assumed to enter the automatic milking station, and controlling the automatic spraying device on basis thereof by aid of the control unit, which is connected to the animal identifying means and the data storage means. The control unit is configured to control the spraying direction of nozzles of the automatic spraying device on basis of the received information about expected hoof position of the identified animal for the implementation of the method. The device for identifying the animal may be any suitable kind of identification reader, and the animal should be provided with any suitable kind of readable identification means, such as a readable tag or the like. The expected hoof position may be the expected distance between the hoofs of the animal, preferably the expected distance between the rear hoofs of the animal when standing in a position in which it can be expected to stand when being milked in said milking station.

Further features and advantages of the present invention will be presented in the following detailed description.

BRIEF DESCRIPTION OF THE DRAWINGS

Exemplifying embodiments of the invention will now be described with reference to the annexed drawing, on which.

DETAILED DESCRIPTION

Figure 1:
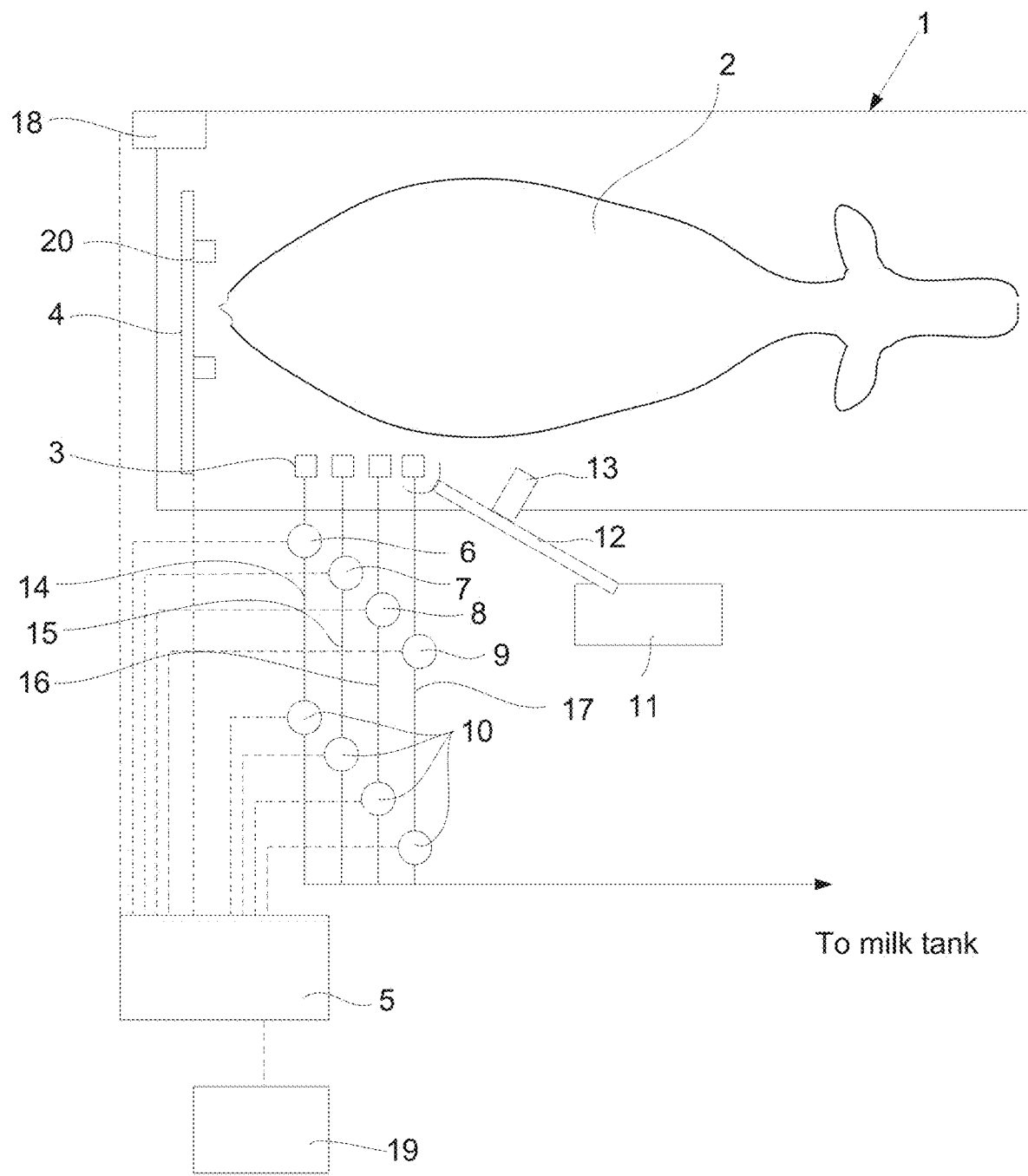
FIG. 1 is a schematic view from above of essential parts of an animal hoof cleaning system according to the present invention.

FIG. 1 shows an animal hoof cleaning system comprising: an automatic milking station 1 configured to automatically milk an animal 2 therein, said automatic milking station 1 comprising a set of teat cups 3 that are configured to be attached to the teats of said animal during milking thereof. The animal hoof cleaning system also comprises an automatic spraying device 4 configured to clean at least one hoof, here the two rear hoofs, of an animal housed in said automatic milking station 1 by spraying a fluid towards the hoofs of said animal, and a control unit 5 configured to control the operation of the automatic spraying device 4. The hoof cleaning system also comprises detecting means 6-9, 10 configured to detect a milking state in which each teat of an animal housed in the milking station is attached to a respective teat cup 3 of the automatic milking station 1. The control unit 5 is configured to control the operation of the automatic spraying device 4 on basis of information from the detecting means 6-9, 10, wherein the control unit 5 is configured to activate the automatic spraying device 4 for spraying on the hoofs of said animal only when the detecting means 6-9, 10 has detected said milking state in which each teat of an animal housed in the automatic milking station is attached to a respective teat cup 3.

The automatic milking station of the exemplifying embodiment shown in FIG. 1 further comprises a robot 11 provided with a robot arm 12 configured for the attaching of the teat cups 3 to the teats of the animal. On the robot arm 12 there is provided a camera 13, and the robot 11 is configured to move the robot arm 12 on basis of information regarding teat position that it receives from the camera 13. The camera 13 may be used also for detecting individual need of hoof cleaning of individual animals, and may thus be connected to said control unit 5. The control unit 5 may thus be configured to evaluate the hoof status and need of hoof cleaning on basis of the information received from the camera 13.

The automatic spraying device 4 may comprise a rail, a movable arm, a conduit, a tube or the like, not shown in detail in FIG. 1, said rail, movable arm, conduit, tube or the like being provided in the rear part of the automatic milking station 1 and being provided with nozzles 20 that are either mounted in a fixed position or are provided with a driving means that enable controlling of their spraying direction, for the purpose of directing them individually with regard to the position of the hoofs of an animal housed in the automatic milking station 1. The spraying device 4 may be configured to spray water or any suitable disinfection solution.

The control unit 5 may comprise any suitable combination of software and hardware necessary for performing the functions for which it is configured according to the present invention. The control unit 5 may be a separate computer, microprocessor, circuit, or the like, but may also be an integral part of a management and/or control system responsible for management and/or control of various parts of an animal arrangement to which the automatic milking station 1 belongs.

The detecting means 6-9 comprises milk meters that are arranged in milk conduits 14-17, one for each teat cup 3, and arranged to measure the milk rate in each of said conduits 14-17. The milk meters 6-9 are operably connected to the control unit 5 and configured to deliver signals indicating the milk flow in said conduits 14-17 to the control unit 5. Based on said signals, the control unit 5 is configured to establish the occurrence of a milking state in which each teat of an animal housed in the milking station 1 is attached to a respective teat cup 3.

As an alternative or supplement to the milk meters, the detecting means may comprise at least one vacuum meter 10. In the embodiment shown, there are several vacuum meters 10 provided, one for each teat cup 3.

In case of detachment of any of the teat cups 3 from its associated teat, there will be an immediate and clear change of pressure in the milk line from the teat cups 3, which can be registered by the vacuum meter. According to one embodiment, the vacuum meter 10 is therefore operably connected to the control unit 5 for the purpose of transmitting signals that indicate whether said milking state is present or not. The control unit 5 is configured to control the operation of the automatic spraying device 4 on basis of said signals from the vacuum meter 10. If different types of meters/sensors are used as detecting means simultaneously, the control unit 5 may be configured to prioritize information from one type of meter before information from another type of meter to establish the milking state, depending on which meter is regarded as more reliable or faster than the other one. For example, the vacuum meter is better suited for detecting sudden and unexpected detachment of a teat cup, since such detachment result in an immediate change of pressure (and a slower change of milking rate). However, the milk meters might be a better tool for estimating an expected ending of the milking session on basis of the changes in milking rate that can be registered by said milk meters.

In the case that the automatic spraying device 4 comprises nozzles 20 the position and spraying direction of which are controllable, the automatic milking station 1 may also preferably comprise a data storage means 19 configured to comprise information regarding the expected hoof position of individual animals that are assumed to enter the automatic milking station, and an identification device 18 configured to identify which animal is housed in the automatic milk station. The control unit is 5 operably connected to said data storage means 19 and to said identification device 18 and configured to control the position and spraying direction of the nozzles 20 of the automatic spraying device 4 on basis of which animal that is positioned in the automatic milking station and on basis of said information regarding that animal's expected hoof position.

The automatic milking station 1 may be of a type known per se and comprise a stall designed for accommodation of one animal at a time for the purpose of milking said animal in said stall. The automatic milking station may be of stationary sort or be part of a so-called rotary parlour in which animals, preferably cows, are milked.

Figure 2:
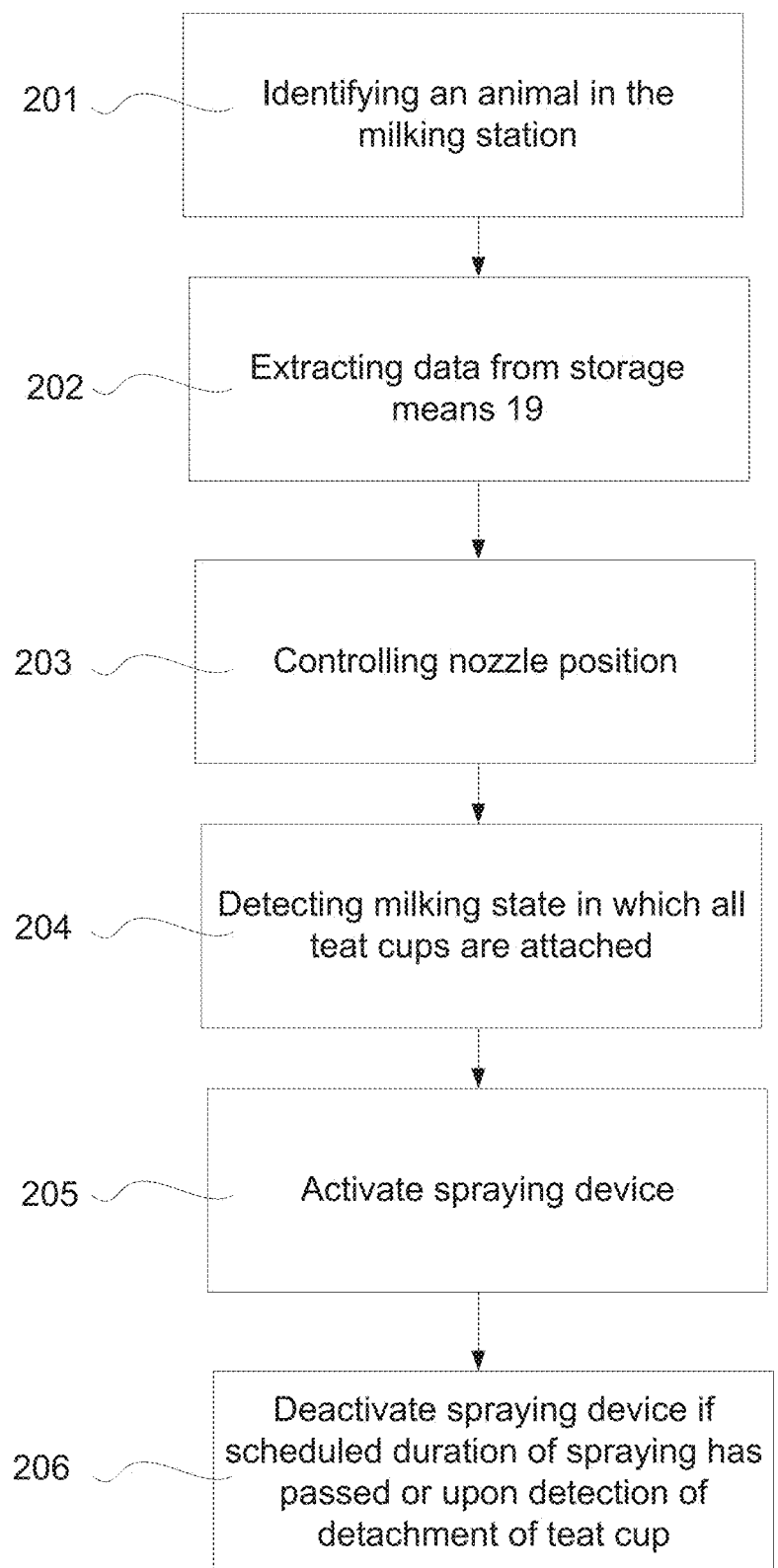
FIG. 2 is a flow chart showing essential steps of a method according to the present invention.

The method of the invention will now be described with reference to FIG. 2, which is a flow chart showing the steps of a possible embodiment of the method of the present invention. It should be understood that the steps discussed hereinafter are all performed through the interaction between the control unit 5, the detecting means 6-9 and/or 10, the automatic spraying means 4, the identification device 18 and the above-mentioned the data storage means 19.

The method may thus comprise the following steps:

201: identifying by means of said identification device 18 which animal out of a plurality of possible animals that is housed in the automatic milking station,

202: extracting data by means of said control unit from said data storage means 19 regarding the expected hoof position of the identified animal,

203: controlling the position of nozzles 20 of the automatic spraying device 4 by means of said control unit 5 on basis of said expected hoof position,

204: detecting by means of said detecting means 6-9, 10 a milking state in which all the teats of the animal are attached to respective teat cup 3,

205: activating the automatic spraying device 4 by means of the control unit 5 within a predetermined time after detection of said milking state,

206: inactivating the automatic spraying device 4, by means of the control unit 5, within a predetermined time period after the activation thereof or upon detection by the detection means 6-9, 10 that any teat cup is detached from its associated teat, whichever occurs first.

Steps 204, 205 and 206 are regarded as essential to the invention in its widest sense. Steps 201, 202 and 203 are optional initial steps that may be applied in further developed embodiments.

It should be noted that the above-described cleaning of the hoofs of an animal may comprise more than one cleaning sequence, but that, in such case, each individual cleaning sequence should still be performed on the same principles as described above. Accordingly, the control unit 5 may be configured to supplement a first cleaning sequence with a second cleaning sequence, wherein the second cleaning sequence may be defined as a treatment sequence in which the fluid may comprise a treating agent, such as a disinfection agent. Accordingly, the present invention suggests that also a treatment sequence performed after a cleaning sequence in connection to milking of the animal (when the udder is more sensible to said aerosols than otherwise) should be performed only upon detection of said milking state, and should not be performed if, during milking in said automatic milking station, any of the teat cups is detached from its associated teat.

The invention claimed is:

1. An animal hoof cleaning system, comprising:
   an automatic milking station (1) configured to automatically milk an animal (2) housed therein, said automatic milking station (1) comprising a set of teat cups (3) that are configured to be attached to the teats of said animal for milking thereof;
   an automatic spraying device (4) mounted in the automatic milking station (1) and configured to clean at least one hoof of the animal by spraying a fluid towards the hoof of said animal;
   a control unit (5) configured to control an operation of the automatic spraying device (4); and
   detecting means (6-9, 10) configured to detect a milking state of the automatic milking station (1), in which every teat of the animal is attached to a respective one of said set of teat cups (3),
   wherein the control unit (5) is configured to control the operation of the automatic spraying device (4) on basis of information from the detecting means (6-9, 10), such that the control unit (5) activates the automatic spraying device (4) for spraying on the at least one hoof of said animal only when said milking state is detected by the detecting means, and inactivates the automatic spraying device (4) upon detection by the detection means that any teat cup (3) has detached from an associated teat.

2. The animal hoof cleaning system according to claim 1, wherein the control unit (5) does not activate the automatic spraying device (4) until at least 10 seconds after the detection means detects said milking state.

3. The animal hoof cleaning system according to claim 1, wherein the control unit (5) activates the automatic spraying device (4) within approximately 60 seconds of the detection means detecting said milking state.

4. The animal hoof cleaning system according to claim 1, wherein the control unit (5) is configured to inactivate the automatic spraying device (4) after either of i) a predetermined time period the control unit (5) activates the automatic spraying device (4), or ii) upon the detection by the detection means that any teat cup (3) has detached from the associated teat, whichever occurs first.

5. The animal hoof cleaning system according to claim 1, wherein the automatic milking system comprises milk meters configured to measure milk flow from each one of said teats of the animal, and that said detecting means (6-9) detects the milking state of the automatic milking station (1) on basis of signals indicative of milk flow from the milk flow meters.

6. The animal hoof cleaning system according to claim 1, wherein the automatic milking system comprises at least one vacuum meter that measures a pressure in a milk line in which milk from the teats flows, and that said detecting means (10) detects the milking state of the automatic milking station (1) on basis of the milk line pressure measured by said at least one vacuum meter.

7. The animal hoof cleaning according to claim 6, wherein the automatic milking system comprises a respective vacuum meter configured to measure the pressure in a respective milk line for a respective teat of the animal.

8. The animal hoof cleaning system according to claim 1, wherein the automatic spraying device (4) comprises nozzles (20) for which a position and spraying direction are controllable, a data storage means (19) having information stored therein regarding an expected hoof position of individual animals, and an identification device (18) configured to identify the animal housed in the automatic milk station,
the control unit (5) operably connected to said data storage means (19) and to said identification device (18), and configured to control the position and spraying direction of the nozzles (20) of the automatic spraying device (4) on basis of an identity of the animal positioned in the automatic milking station (1) determined by the identification device and on basis of said information stored in the data storage means of an expected hoof position of the animal.

9. A method of cleaning at least one hoof of an animal in an automatic milking station (1), in which a fluid is sprayed onto the at least one hoof of an animal that is housed in the milking station (1) and is being milked in said milking station (1), said spraying performed by an automatic spraying device (4) mounted in said milking station (1), and an operation of the automatic spraying device (4) controlled by a control unit (5), said method comprising:
detecting, by means of a detecting means (6-9, 10) in communication with the control unit (5), a milking state of the automatic milking station (1) in which every one of the teats of said animal is attached to a respective teat cup (3) of an automatic milking device of the automatic milking station (1); and
initiating, by the control unit (5), an activation of said spraying of the at least one hoof of said animal only upon detection of said milking state by the detecting means,
wherein the control unit (5) inactivates the spraying of the at least one hoof upon the detecting means (6-9, 10) detecting that any one of the teat cups (3) become unattached from a corresponding teat.

10. The method according to claim 9, wherein the control unit (5) delays the activation of the spraying until at least 10 seconds after the detection means detects said milking state.

11. The method according to claim 9, wherein the control unit (5) carries out the activation of the spraying within approximately 60 seconds of the detection means detecting said milking state.

12. The method according to claim 9, further comprising:
inactivating the spraying of the at least one hoof of said animal after either of i) a predetermined time period from the initiating thereof, or ii) upon the detection means detecting that any one of the teat cups (3) has become detached from the corresponding teat, whichever occurs first.

13. The method according to claim 9, wherein said milking state is detected by registration of a milk flow in a respective milk line in which milk flows from a respective teat cup (3) of the teat cups (3) during milking of said animal.

14. The method according to claim 9, wherein said milking state is detected by registration of a pressure in a milk line in which milk from the teat cups (3) flows during milking of said animal.

15. The method according to claim 9, wherein said milking state is detected by registration of a pressure in a milk line of a teat cup of the teat cups (3) in which milk from a respective teat of the animal flows.

16. The method according to claim 9, further comprising:
identifying the animal by means of an identification device (18);
associating the identified animal with an expected hoof position of the animal stored in a data storage means (19) having data stored thereon of expected hoof positions of a plurality of individual animals; and
controlling the automatic spraying device (4), by means of the control unit (5) in communication with the identification device (18) and the data storage means (19), on basis of the associated expected hoof position of the animal.

* * * * *